United States Patent [19]

Nicholls et al.

[11] Patent Number: 5,061,031
[45] Date of Patent: Oct. 29, 1991

[54] FLUORIDE GLASS OPTICAL COUPLER COMPONENT, COUPLER, AND METHODS

[75] Inventors: Simon T. Nicholls, Woodbridge; Michael Scott, Needham Market, both of England

[73] Assignee: British Telecommunications public limited company, Great Britain

[21] Appl. No.: 602,252

[22] PCT Filed: May 5, 1989

[86] PCT No.: PCT/GB89/00479
§ 371 Date: Nov. 6, 1990
§ 102(e) Date: Nov. 6, 1990

[87] PCT Pub. No.: WO89/11111
PCT Pub. Date: Nov. 16, 1989

[30] Foreign Application Priority Data

May 9, 1988 [GB] United Kingdom ............ 8810906.1

[51] Int. Cl.[5] ................................................ G02B 6/26
[52] U.S. Cl. ........................................ 385/15; 385/123; 385/141

[58] Field of Search ............ 350/96.15, 96.16, 96.34, 350/96.29, 96.3

[56] References Cited

U.S. PATENT DOCUMENTS

| 4,560,246 | 12/1985 | Cotter | 350/96.16 |
| 4,790,619 | 12/1988 | Lines et al. | 350/96.16 |
| 4,913,507 | 4/1990 | Stamnitz et al. | 350/96.15 |
| 4,964,131 | 10/1990 | Liu et al. | 372/6 |

Primary Examiner—Frank Gonzalez
Attorney, Agent, or Firm—Nixon & Vanderhye

[57] ABSTRACT

A coupler component is formed by embedding an optic fibre of fluoride glass in a slot in a substrate of a crown glass or flint glass which has a hardness similar to that of the fibre. The slot has a convex base and the slotted face of the substrate is ground and polished using a non-aqueous polishing medium to expose a portion of the embedded fibre. A coupler may be formed by mating the polished faces of two such components.

11 Claims, 2 Drawing Sheets

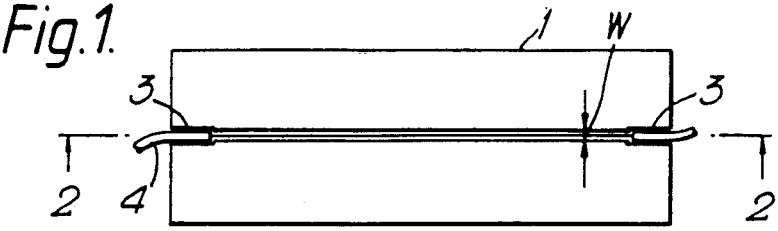
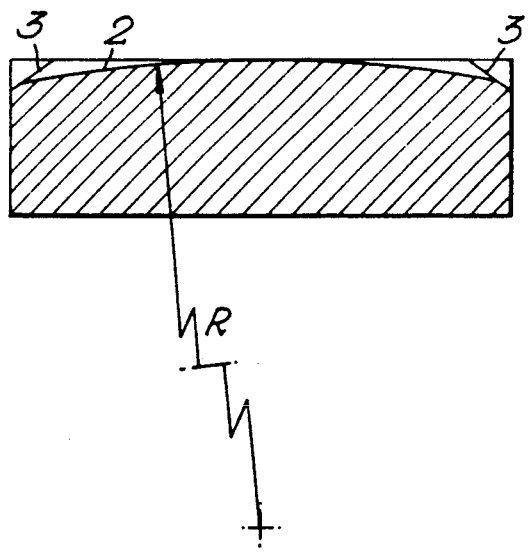
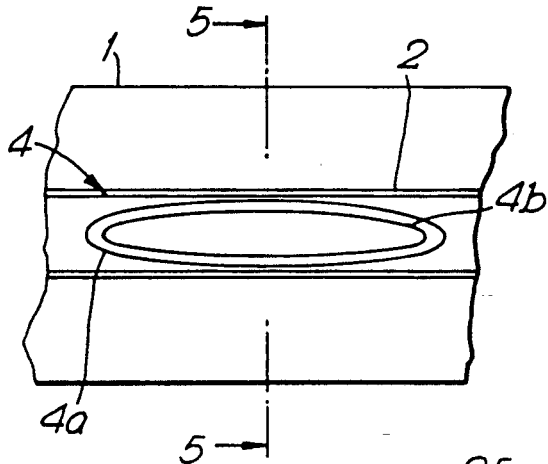
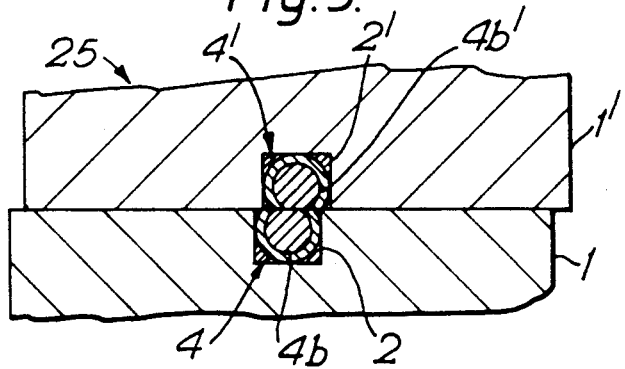

FLUORIDE GLASS OPTICAL COUPLER COMPONENT, COUPLER, AND METHODS

FIELD OF THE INVENTION

The present invention relates to optical couplers formed from optic fibres composed of fluoride glass.

BACKGROUND OF THE INVENTION

Fluoride type glasses, normally containing fluorozirconate (ZrF4) and optic fibres formed from such glasses are disclosed in Br Telecom Technol J vol 5 No 2 Apr. 1987 "Progress in Fluoride Fibres for Optical Communications"—P W France et al and in a paper entitled "Properties of Fluorozirconate Fibres for Applications in the 0.5 to 4.5 Micrometre Region" by P W France et al which was presented at the SPIE Conference at San Diego in August 1987. Such fluoride fibres are the subject of European Patent Application No. 85304280.2 (Publication No. 170380). These three documents are incorporated herein by reference and it is to be understood that the term "fluoride glass" includes but is not limited to all the fluoride-containing glasses described in the above papers and all the fluoride-containing glasses within the scope of the disclosure of the above patent application.

Fluoride glass optic fibres have the capability to transmit wavelengths in the far infra red region of the spectrum and have many applications, particularly in the area of optical fibre sensors. However, if such devices are to be used to best advantage then there is a requirement for all of the ancillary equipment that is used in silica fibre systems, including directional couplers, to be composed of fluoride glass optic fibres.

A method of forming an optical coupler component is known which comprises the steps of forming a channel in a block of substrate material, the channel being curved along its length, laying a length of optic fibre in such channel and bonding the optic fibre to a curved interior surface of the channel, and removing substrate material, and at least cladding material of the optic fibre on the convex side of said interior surface to form a face which exposes a length of at least the cladding of the embedded optic fibre, and polishing said face. An optical coupler can the be formed by bringing together two such optical coupler components at their polished faces with the exposed portions of the optic fibres at least partially superimposed.

However we have found that the glass substrates used in the manufacture of optical coupler components for silica fibres are unsuitable for the manufacture of similar optical coupler components utilising optic fibres of fluoride glass.

In order to obtain optical coupler components of reproducible properties, it is necessary to use a substrate material of a hardness similar to that of the fluoride glass of which the optic fibres are composed. Furthermore we have found that the aqueous polishing media conventionally used for polishing away the substrate and optic fibre material of conventional silica fibre optical coupler components result in undesirable chemical attack on fluoride optic fibres when used to manufacture optical coupler components utilising such fibres. this results in unpredictable effects on the coupling properties of the resulting component. Furthermore, we have found that the flexible band saws used to form the channels in the optical components in the prior art leads to random variations in the radius of curvature of the channel which in turn affects the coupling properties.

SUMMARY OF THE INVENTION

An object of the present invention is to overcome or alleviate the above disadvantages.

Accordingly the invention provides a method of forming an optical coupler component comprising steps of forming a channel in a block of substrate material, the channel being curved along its length, laying a length of optic fibre in said channel and bonding the optic fibre to a curved interior surface of the channel, removing substrate material and at least cladding material of the optic fibre on the convex side of said interior surface to form a face which exposes a length of at least the cladding of the embedded optic fibre, and polishing said face, characterised in that said optic fibre is composed of fluoride glass, said channel is formed by a method which results in a predetermined channel curvature whereby the longitudinal access of the embedded optic fibre has a predetermined curvature, the polishing of said face is conducted with a non-agueous polishing medium and the hardness of the substrate material is compatible with the hardness of fluoride glass such that the exposed optic fibre material is flush with said face.

Preferably the hardness of the substrate material is in the range 440 Class (4) to 600 Class (6) (Knoop hardness).

Preferably the temperature co-efficient of expansion of the substrate material is similar to that of the optic fibre and is in the range 60 to $80 \times 10^{-7}/°K$.

Preferably the substrate material is flint glass or crown glass.

The invention also provides a method of forming an optical coupler comprising bringing together the polished faces of two optical coupler components incorporating fluoride fibres as defined above such that the eposed portion of the fluoride optic fibres are at least partially super-imposed.

The invention also provides optical coupler components and optical couplers obtainable by the respective methods of the invention.

BRIEF DESCRIPTION OF THE DRAWINGS

Preferred embodimets of the invention are described below by way of example only with reference to FIGS. 1 to 5 of the accompanying drawings, of which:

FIG. 1 is a plan view of an optical coupler component formed by a method in accordance with the invention.

FIG. 2 is a section taken on 2—'of FIG. 1;

FIG. 4 is a plan view showing the exposed portion of the optic fibre of the polished face of the coupler component shown in FIG. 1; and FIG. 5 is a transverse cross section along 5—5 of FIG. 4 through the mid portion of an optical coupler comprising two coupler components as shwon in FIG. 1 joined at their polished faces.

DETAILED DESCRIPTION OF THE DRAWINGS

Figure 3:
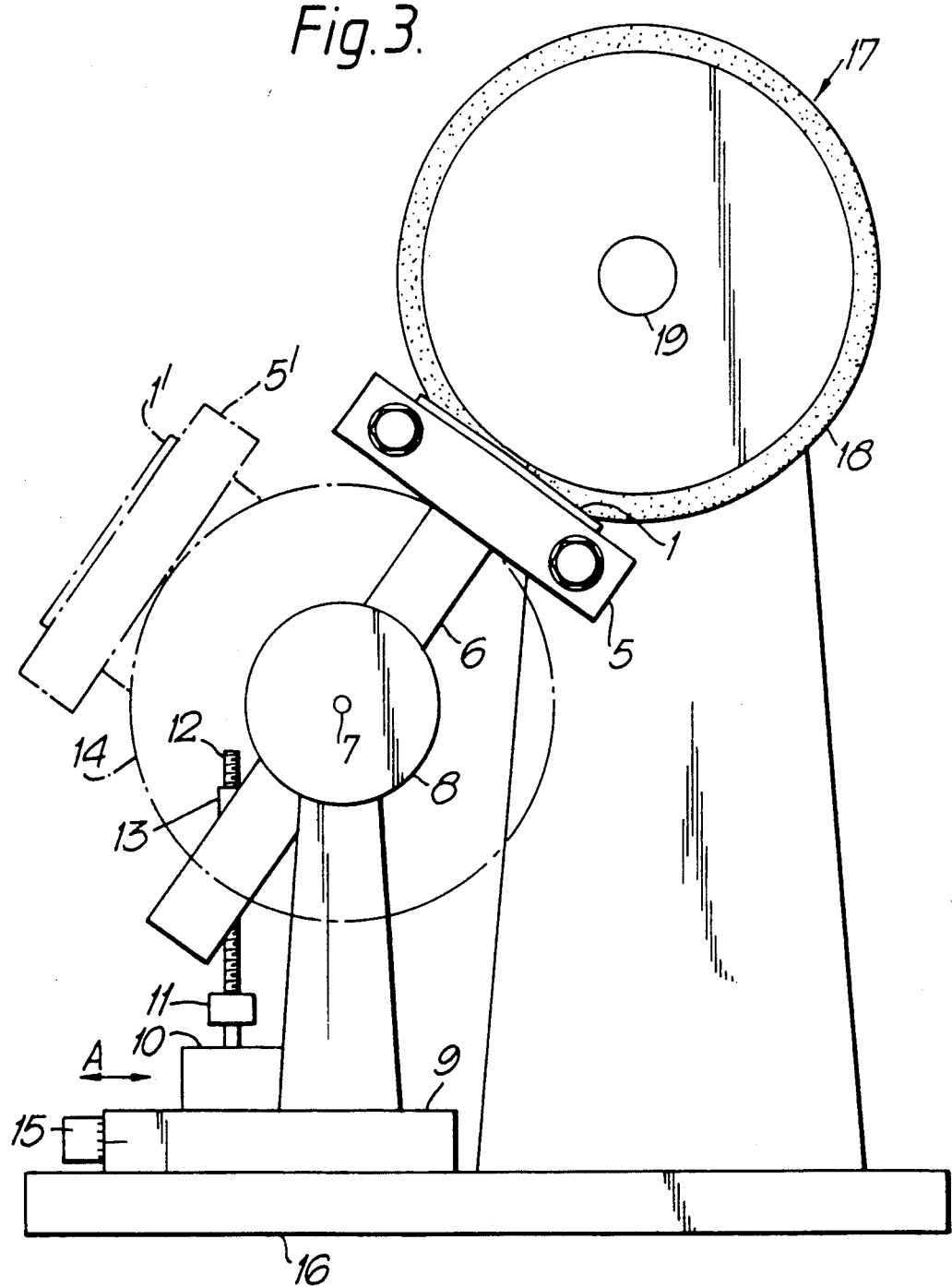
FIG. 3 is a schematic elevation of apparatus for forming the channel 2 shown in FIGS. 1 and 2.

Referring to FIGS. 1 and 2, the coupler component shown comprises a block 1 of crown glass or flint glass, the faces of which have a flatness tolerance of two micrometers and a plus or minus squareness tolerance of three micrometers, with three micrometers parallelism on opposite faces. A slot 2 which is marginally wider (by 2 to 5 micrometers) than the outside diameter of the cladding of an optic fibre 4 (which is typically 140 micrometers) is formed in the block and as shown in FIG. 2 it is convex with a radius R of 200 to 400 millimeters and the ends of the slot 2 are relieved by diagonal cuts 3 which are sufficiently wide to accommodate the coating of the optic fibre 4. The width W of the slot 2 is sufficient to enable the fibre cladding to be accurately located in the slot by a suitable epoxy resin.

As will subsequently become clear, it is not essential that the base of the slot 2 should be convex; instead it may be concave and may extend to a point closely adjacent the opposite face of the block, which opposite face may subsequently be machined to expose a length of the optic fibre bonded to the base of the slot 2. In another variant, the slot 2 may be curved in plan view and the optic fibre 4 may be bonded to a side wall of a slot (preferably the convex side wall) and the block may be machined in a direction towards this convex side wall to expose a length of the optic fibre. However, a slot which is straight in plan view but which has a convex base as shown in FIG. 2 is the preferred arrangement and can be cut with apparatus as shown in FIG. 3.

The apparatus shown in FIG. 3 comprises a rotary diamond saw 17 which is mounted for rotation about an axle 19 and comprises a peripheral cutting portion 18, the width of which is slightly less (suitably 2 to 5 micrometers less) than the desired width of the slot 2. The block 1 is clamped by clamp 5 on the end of an arm 6 which in turn is rotatable about axle 7. The axle 7 is supported on a mounting 9 which can be advanced towards and away from the cutting wheel 17 in the direction indicated by the arrow A by a micrometer screw 15 in order to adjust the depth of the cut. Once the desired depth of cut has been selected, the arm 6 is swung towards the rotating cutting wheel 17 (which is suitably driven at seven and a half thousand RPM) so that the block 1 transverses the cutting portion 18 in approximately four and a half minutes to form a slot along the length of one face. The radius of curvature R (FIG. 2) of the resulting convex base of the slot is determined by the distance between the periphery of the cutting portion 18 and the axis of the axle 7. Accordingly it is arranged that the arm 6 and the clamp 5 mounted thereon are replaceable as a unit to enable different radii of curvature to be selected. In an alternative embodiment, the arm 6 may be replaced by a wheel 14 as shown in chain dotted lines and a plurality of clamps 5 only one of which is shown, in chain dotted lines) may be mounted thereon with blocks 1 clamped therein. It has been found that the width of the slot may be varied within certain limits by varying the rate of traverse of the block 1 across the cutting wheel 17. In the apparatus shown, this rate of traverse may be varied by varying the resistance to rotation of the axle 7 applied by a viscose coupling 8. The arm 6 is rotated about axle 7 by a stepper motor 10 via a further viscose coupling 11 and a drive screw 12 which engages a co-operating drive 13 which is pivoted on arm 6. The mounting 9 and the mounting of the cutting wheel 17 are mounted on a common base 16.

When the slot 2 has been formed, the fibre 4 is prepared to assembly by stripping an appropriate length of primary coating for example by dipping the fibre in methylene dichloride. The optic fibre 4 is then located in the slot 2 and held in close contact with the convex base of the slot 2 by appropriately tensioning the fibre with a suitable jig (not shown). It is ensured that the fibre does not bend tightly over the ends of the radiussed base of the slot, in order to prevent bend losses or possibly cracking of the fibre. The block 1 is then heated to 120° C. and the slot is filled with an epoxy resin such as "Ablebond Ablestick a-41". The temperature is maintained for two hours until the cement is fully cured. The fibre coatings at the end of the slot are then terminated in the diagonal cut out portions 3 using a low temperature 2-part epoxy resin such as "DO100" manufactured by 3M.

The resulting assembly is then mounted in a polishing jig (not shown) and the majority of the substrate material above the convex side of the optic fibre 4 is removed by grinding. This process is continued until the surface of the fibre is exposed or lies only a few microns below the ground surface.

The jig is then transferred to a lapping machine (not shown) where further material is removed using 304 grade carborundum powder in suspension in ethylene glycol until a point some four micrometers inside the outer diameter of the fibre core is reached. In this condition an elliptical region of the fibre core 4b and cladding 4a is exposed as shown in FIG. 4.

From this point, polishing grades of powder may be used or further lapping may be done depending on the degree of coupling required and the operating wavelength. The abrasive polishing material is suspended in a liquid of higher refractive index than the fibre such as "Cargille 1.616" fluid which is a proprietary index matching fluid of refractive index 1.616 and is a blend of silicone, hydrocarbon and other organic liquids. It is important that the suspension liquid is not water-based in order to prevent attack on the optic fibre. A laser of the same wavelength as the wavelength to be used for the resulting optical coupler is connected to one end of the optic fibre 4 and the other end of the optic fibre is connected to an optical power meter. Polishing is then continued until the required power loss is achieved. The powder loss of the resulting optical coupler component will in general be different from the power loss to the polishing fluid obtained during the polishing process and in order to establish the required power loss at which polishing must be terminated, empirical tests are required. For example, using multimode fluoride fibre of ZBLAN glass or typically $BaF_2$ (Hoya Glass) substrate glass and a wavelength of 1300 nanometers a loss figure of 30dB into the polishing fluid is required in order to obtain a coupler (comprising two coupler components aligned face to face) with a coupling ratio of 50%.

FIG. 5 shows a coupler 25 formed by laying the polished face shown in FIG. 4 of one coupler component against the corresponding polished face of a similar coupler component (indicated by primed reference numerals). If necessary, the precise coupling ratio may be adjusted by shifting one component relative to the other to displace the optic fibre 4' of one coupler component to one side of the optic fibre 4 of the other component as shown in FIG. 5.

It is not essential that the curvature of the slot 2 should be constant along its length but it must be of predetermined curvature, since the coupling ratio will depend on the curvature of the longitudinal axis of the embedded optic fibre which will be determined by the curvature of the slot 2. Even though the polishing might be accurately terminated when a desired power loss into the polishing fluid is established, if the curvature of the slot 2 is uncertain then the relationship between the power loss into the polishing fluid and the coupling ratio of the final coupler is uncertain and it is not possible to obtain a reproducible coupling ratio. Thus the apparatus shown in FIG. 3 and the method of cutting the slot involving a predetermined channel curvature leads to a significantly closer control of the coupling ratio of the resulting optical coupler.

While the invention has been described in connection with what is presently considered to be the most practical and preferred embodiment, it is to be understood that the invention is not to be limited to thge disclosed embodiment, but on the contrary, is intended to cover various modifications and equivalent arrangements included within the spirit and scope of the appended claims.

We claim:

1. A method of forming an optical coupler component comprising the steps of forming a channel (2) in a block of substrate material (1), the channel being curved along its length, laying a length of optic fibre (4) in said channel and bonding the optic fibre to a curved interior surface of the channel, removing substrate material and at least cladding material (4b) of the optic fibre on the convex side of said interior surface to form a face which exposes a length of at least the cladding (4b) of the embedded optic fibre, and polishing said face, characterised in that said optic fibre (4) is composed of fluoride glass, said channel (2) is formed by a method which results in a predetermined channel curvature whereby the longitudinal axis of the embedded optic fibre has a predetermined curvature, the polishing of said face is conducted with non-aqueous polishing medium and the hardness of the substrate material is compatible with the hardness of flouride glass such that the exposed optic fibre material is flush with said face.

2. A method as claimed in claim 1 wherein said channel (2) is formed by a rotating cutting wheel (17), said curved interior surface being formed at the back of the channel by the periphery of the cutting wheel.

3. A method as claimed in claim 2 wherein the axis of rotation of the cutting wheel (17) is transversed relative to the substrate block (1) in a predetermined path such that said curved interior surface is convex, substrate material being removed from the side of the substrate block cut by the cutting wheel.

4. A method as claimed in claim 1 wherein the radius of curvature (R) of said channel (2) is in the range 200 mm to 400 mm.

5. A method as claimed in claim 1 wherein the temperature co-efficient of expansion of the substrate material (1) is in the range 60 to $80-10^{-7}/$ °K.

6. A method as claimed in claim 1 wherein the hardness of the substrate material (1) is in the range 440 class (4) to 600 (6) (knoop hardness).

7. A method as claimed in claim 1 wherein said substrate material is flint glass or crown glass.

8. A method as claimed in claim 1 wherein the substrate material (1) is refmoved and/or said face is polished using abrasive material suspended in a fluid of predetermined refractive index, the refractive index of the fluid being equal to or greater than that of the optic fibre cladding (4b), optical energy being directed into the optic fibre and the power lost or transmitted through the fibre being monitored whilst said abrasive material suspended in said fluid is applied to the substrate block (1).

9. A method of forming an optical coupler (25) comprising the steps of:
bringing together the polished faces of two optical coupler components, wherein each of said components is made in accordance with the method as in claims 1, 2, 3, 4, 5, 6, 7, or 8, and
the exposed portions of the optic fibres (4, 4') are at least partially superimposed.

10. An optical coupler component made by a method as claimed in claim 1.

11. An optical coupler made by a method as claimed in claim 9.

* * * * *